United States Patent
Sternowski

(10) Patent No.: US 7,092,645 B1
(45) Date of Patent: Aug. 15, 2006

(54) ELECTRO OPTICAL MICROWAVE COMMUNICATIONS SYSTEM

(75) Inventor: Robert H. Sternowski, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 641 days.

(21) Appl. No.: 10/319,105

(22) Filed: Dec. 13, 2002

(51) Int. Cl.
 H04B 10/142 (2006.01)
 H04B 10/145 (2006.01)
 H04B 10/148 (2006.01)

(52) U.S. Cl. .................................... 398/204
(58) Field of Classification Search ............... 398/204
See application file for complete search history.

(56) References Cited

U.S. PATENT DOCUMENTS

| | | | | |
|---|---|---|---|---|
| 3,970,839 A | * | 7/1976 | Javan ......................... | 398/131 |
| 5,003,625 A | * | 3/1991 | Khoe ......................... | 398/204 |
| 5,293,170 A | * | 3/1994 | Lorenz et al. ............... | 342/352 |
| 5,339,184 A | * | 8/1994 | Tang .......................... | 398/116 |
| 5,526,158 A | * | 6/1996 | Lembo ....................... | 398/204 |
| 5,663,639 A | | 9/1997 | Brown et al. ............... | 324/96 |
| 5,687,261 A | * | 11/1997 | Logan ......................... | 385/24 |
| 5,710,651 A | * | 1/1998 | Logan, Jr. ................... | 398/168 |
| 5,796,506 A | * | 8/1998 | Tsai ............................ | 398/204 |
| 6,493,131 B1 | * | 12/2002 | Tarng et al. ................. | 359/326 |

OTHER PUBLICATIONS

"Fiber-optic antenna remoting for multisector cellular cell sites", Tang, D, Communications, 1992. ICC 92, Conference record, SUPERCOMM/ICC '92, Discovering a New World of Communications. IEEE International Conference on (Jun. 14-18, 1992).*

* cited by examiner

Primary Examiner—Kenneth Vanderpuye
Assistant Examiner—Danny Wai Lun Leung
(74) Attorney, Agent, or Firm—Nathan O. Jensen; Kyle Eppele

(57) ABSTRACT

A wideband communications system uses a photomixer, a radio frequency (RF) mixer, and an antenna. The photomixer is comprised of high speed phototransistors that are illuminated by two laser beams. The laser beams are generated by two lasers, one tunable, and conveyed to the photomixer via fiber optic cables. The two beams are mixed by the photomixer to generate a radio heterodyne signal that is mixed with antenna signals to generate an intermediate frequency (IF) signal based on the differences of the generated heterodyne frequency and the antenna signals. Conventional fiber optic means may be used to convey the IF signals, along with the fiber optic cables to the photomixer, to and from a remote RF head located at some distance from the rest of the communications system to overcome losses in transmission lines.

19 Claims, 7 Drawing Sheets

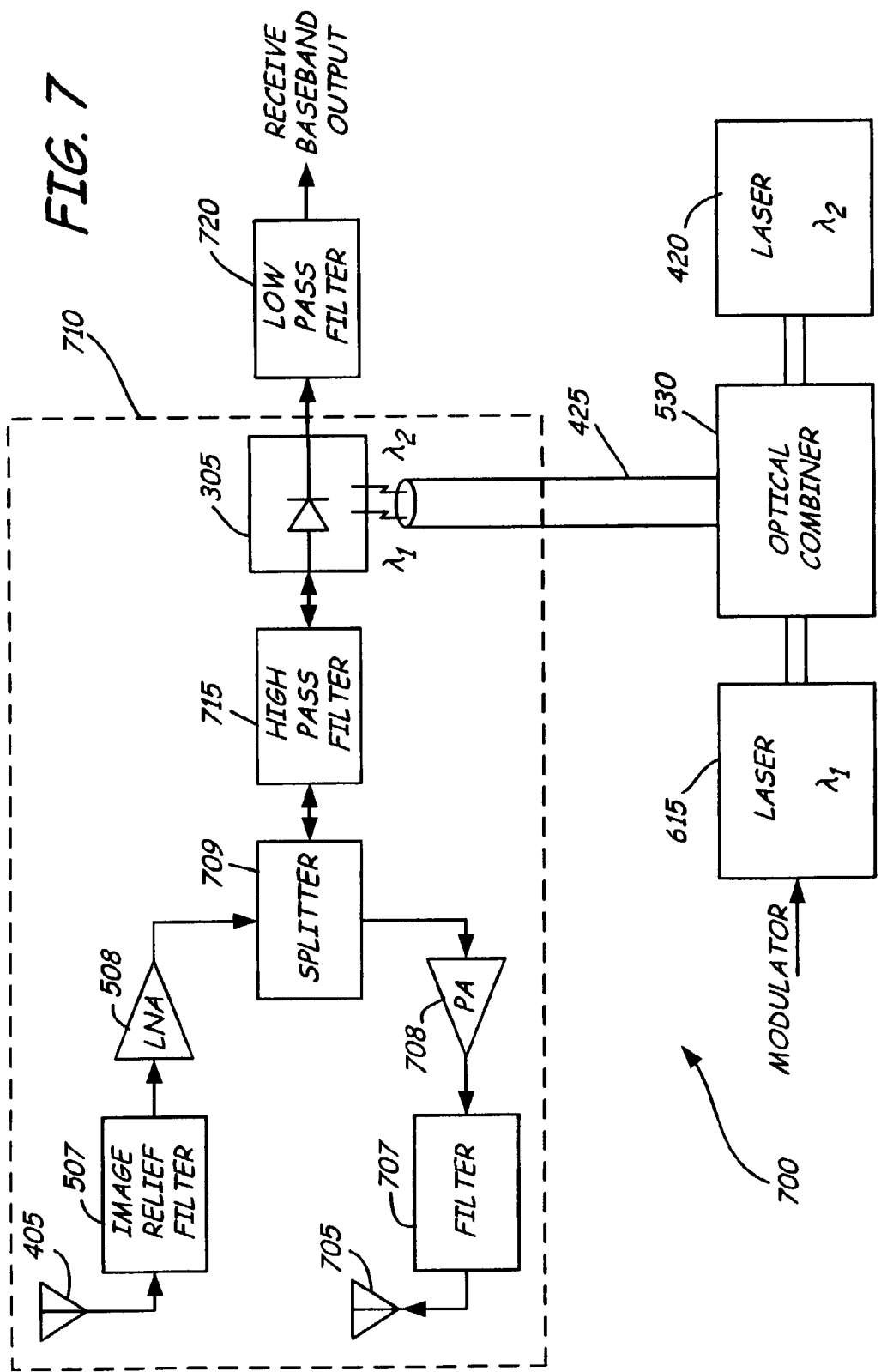

ELECTRO OPTICAL MICROWAVE COMMUNICATIONS SYSTEM

BACKGROUND OF THE INVENTION

This invention relates to communications systems, microwave communications systems, and specifically an electro optic microwave communications system.

As the information age has grown, the availability of wireless bandwidth has been seriously constrained by available spectrum. The obvious growth path, as spectrum becomes fully occupied or oversubscribed, is to move upward in frequency to unused bandwidth. The upper frequency limit has steadily risen to where the use of the millimeter and terahertz (THz) spectrum is now realistic. Building radio frequency (RF) circuitry for these frequency ranges is very difficult and expensive and in particular a unique system must be built for each sub-band. No known technology exists for generation (transmit) and reception (receive) of signals across multiple sub-bands or indeed across the entire band (up to 1 THz). Various absorption holes exist in the THz frequency range and hence useful communications is possible in these holes. Government surveillance systems are already vitally concerned with signal activity in this range and are hampered by the lack of RF technology to prosecute such signals.

The state-of-the-art today finds commercial communications up to 67 gigahertz (GHz), and military uses to 94 GHz and beyond. Much experimentation is underway in the terahertz range, and various specialized users are already demanding receive capability in the 100- to 300-GHz range. From a pure atmospheric attenuation perspective shown in FIG. 1, it can be seen that there are several low-attenuation bands at 140, 240 and 560 GHz usable for free space communications. Many uses, however, do not rely on low-attenuation bands, and can utilize any terahertz frequency for deliberate limited range communication.

Current technology is slowly evolving toward an expanded set of block converters, each using a unique technology optimized to a particular frequency band to cover the terahertz frequency range. Typically, the block converter includes an antenna, preamplifier and mixer driven by a fixed, multiplied local oscillator. Two or more block converters may be used in cascade.

What is lacking is the technology to implement a continuous-tuning communications or surveillance system that covers the 20–500 GHz band, similar to the common availability today of receivers that cover 20–520 megahertz (MHz).

SUMMARY OF THE INVENTION

An electro optic microwave communications system receiver for receiving a high frequency microwave transmitted signal is disclosed. The receiver comprises an antenna to receive the transmitted signal and to provide a received signal. A photomixer is connected to the antenna to provide an injection signal to mix with the received signal to down convert the received signal to an intermediate frequency (IF) signal. A fixed laser illuminates the photomixer at a first frequency and a tunable laser illuminates the photomixer at a second frequency. At least one fiberoptic cable connects the fixed laser and the tunable laser to the photomixer. The photomixer mixes the fixed laser and the tunable laser to provide the injection signal at a frequency equal to the difference of the first frequency and the second frequency.

In a first embodiment of the electro optic microwave communications system receiver a mixer connected between the antenna and the photomixer mixes the received signal with the injection signal to down convert the received signal to an IF signal. This embodiment of the electro optic microwave communications system receiver may comprise a fast Fournier transform (FFT) connected to the photomixer to eliminate image responses and provide an output.

In a second embodiment of the electro optic microwave communications system receiver the photomixer mixes the injection signal with the received signal to down convert to an IF signal. This embodiment of the electro optic microwave communications system receiver may further comprise an image reject filter connected to the antenna to reject receiver image response signals and a low amplifier connected between the image reject filter and the photomixer to amplify the received signals.

In the electro optic microwave communications system receiver a first fiberoptic cable may be used to connect the fixed laser to the photomixer and a second fiberoptic cable may be used to connect the tunable laser to the photomixer.

In the electro optic microwave communications system receiver an optical combiner may be connected to the fixed laser and the tunable laser and one fiber optic cable is connected to the optical combiner and the photomixer.

The electro optic microwave communications system receiver further comprises a laser IF modulator connected to the photomixer to modulate a laser beam with the IF signal. An IF fiberoptic cable is connected to the laser IF modulator to transmit the IF modulated laser beam to a laser IF demodulator that demodulates the IF modulated laser beam.

In the electro optic microwave communications system receiver the length of the one fiberoptic cable and the IF fiberoptic cable may be sufficient to remotely locate the antenna, photomixer, and laser IF modulator.

It is an object of the present invention to provide a very wideband terahertz-range communications system.

It is an object of the present invention to utilize a photomixer in implementing a terahertz communications system.

It is an advantage of the present invention to utilize lasers and low-loss fiber optic components to aid in implementing a terahertz communications system.

It is an advantage of the present invention to provide continuous-tuning in the terahertz frequency band.

It is a feature of the present to be able to locate terahertz converters and other RF components at large distances from the remainder of the communications system due to the use of low-loss fiber optic cables.

It is a feature of the present invention to replace tunable frequency synthesizers for the terahertz range that are difficult or impossible to implement.

BRIEF DESCRIPTION OF THE DRAWINGS

The invention may be more fully understood by reading the following description of the preferred embodiments of the invention in conjunction with the appended drawings wherein:

FIG. 7 is a block diagram of a terahertz range transceiver using the photomixer of FIG. 3.

DETAILED DESCRIPTION

Figure 2:
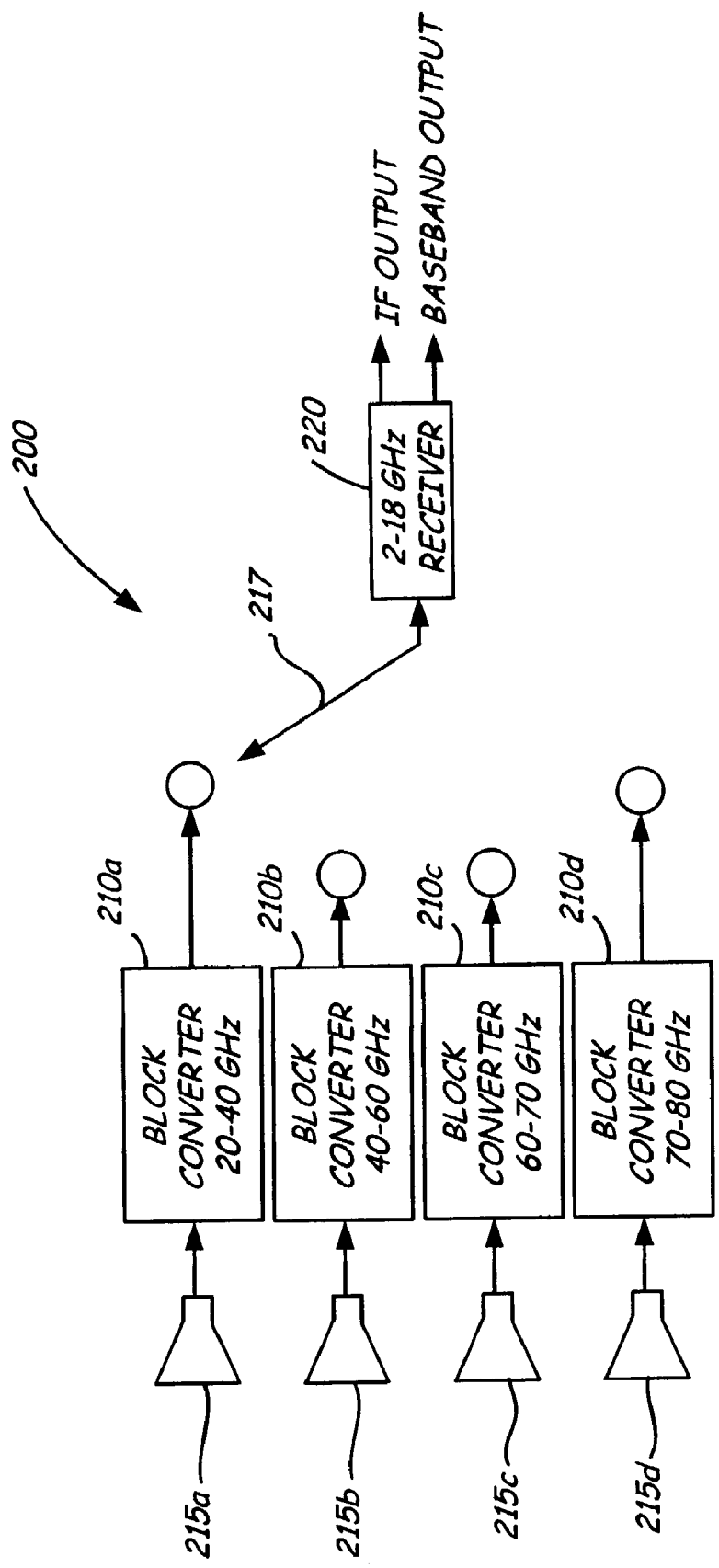
FIG. 2 is a block diagram of a conventional search receiver architecture for the terahertz frequency range.

The implementation of a conventional receiver 200 for the terahertz frequency range is following the current architecture of millimeter wave receivers, that is, a group of narrowband block converters 210a–d in parallel as shown in FIG. 2. Due to component technologies, primarily the limited frequency response of each semiconductor process or structure, only a 10–20 GHz bandwidth is typically attainable. Tunable frequency synthesizers spanning any significant frequency range are difficult or impossible to implement to support a superheterodyne converter architecture. Thus a typical surveillance system consists of a bank of individual block converters 210a–d, each spanning 10–20 GHz using a fixed local oscillator (not shown), and typically each with its own antenna 215a–d to eliminate a high-loss microwave switching subsystem. These block converters 210a–d typically convert down to a 2–20 GHz range and are selected by a switch 217. A tunable receiver 220 processes and/or demodulates the incoming signals for useful information. In the case of a search receiver system, a fast Fourier transform (FFT) (not shown) operates on a wideband output from the tunable receiver 220.

Figure 1:
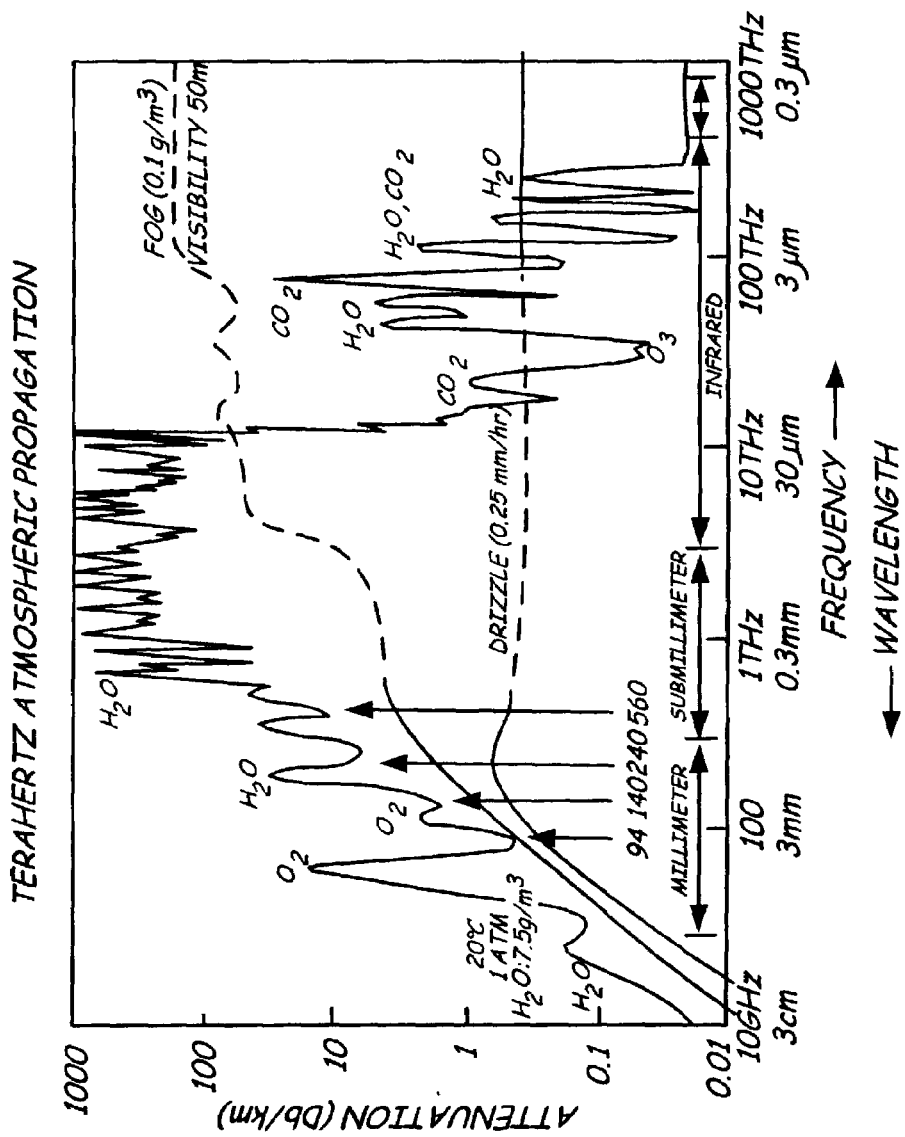
FIG. 1 is a graph showing atmospheric propagation in the terahertz frequency range.

A more interesting approach to implementing a terahertz communications system comes from recognizing that the terahertz band is only an order of magnitude in frequency below the mid-infrared optical band as shown in FIG. 1, suggesting that an electro optical implementation may be a more capable, albeit innovative, approach to implementing a terahertz receiver. Recent work on the heterodyne conversion of signals between the optical and microwave domains is particularly relevant to the present invention.

Figure 3:
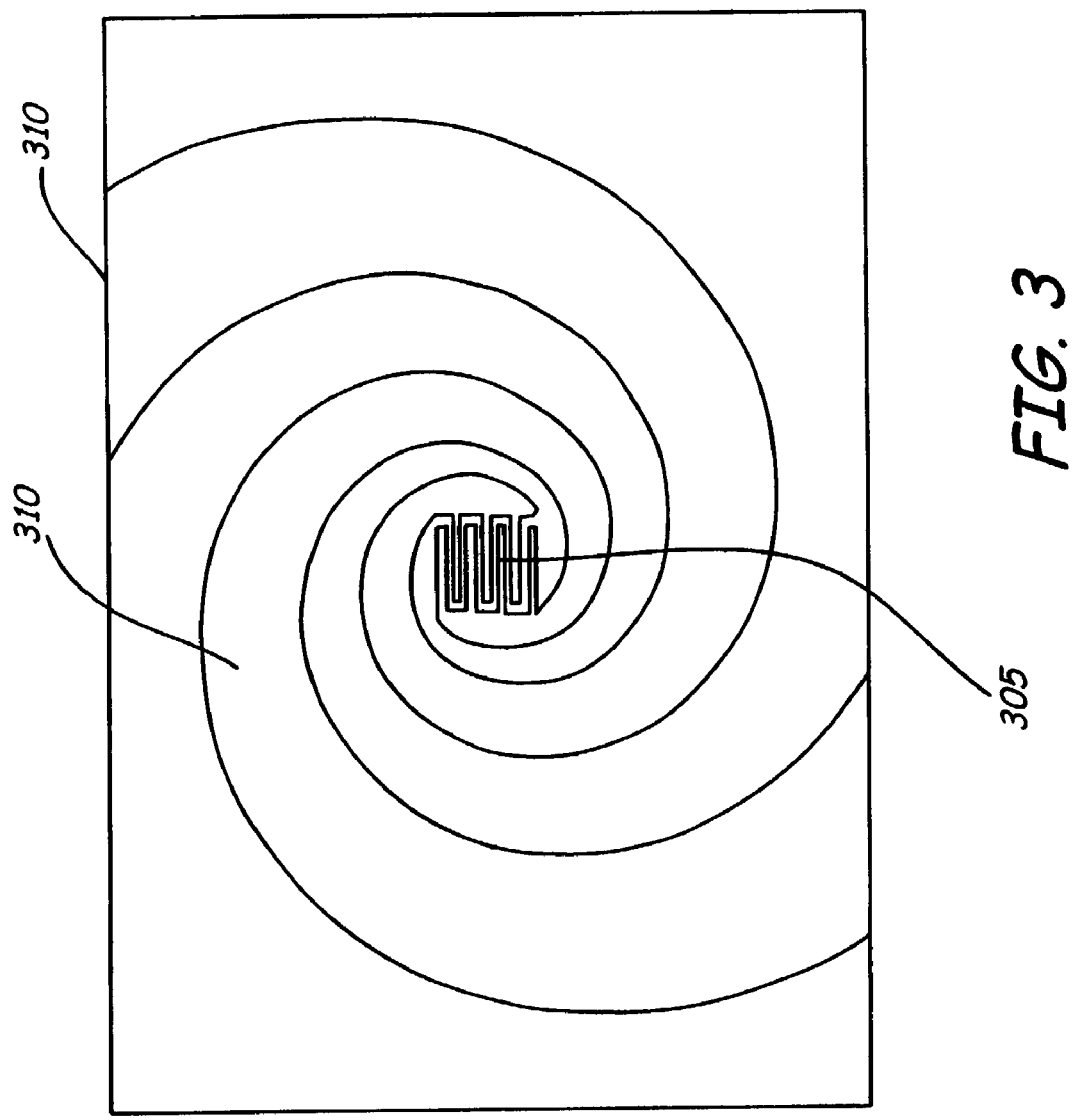
FIG. 3 is a diagram of a photomixer and antenna.

The present invention builds upon experimental work done on optical heterodyning and frequency conversion as described in U.S. Pat. No. 5,663,639 incorporated herein by reference. A pair of lasers separated in frequency by a desired local oscillator (LO) frequency is applied to a photodiode, called a photomixer 305 shown in FIG. 3, whose non-linearity then generates a signal equal to their difference. FIG. 3 shows an integrated spiral antenna 310 and the photomixer 305 used to generate and radiate signals between approximately 100 GHz and 1 THz using a laser pair illuminating the photomixer 305.

Figure 4:
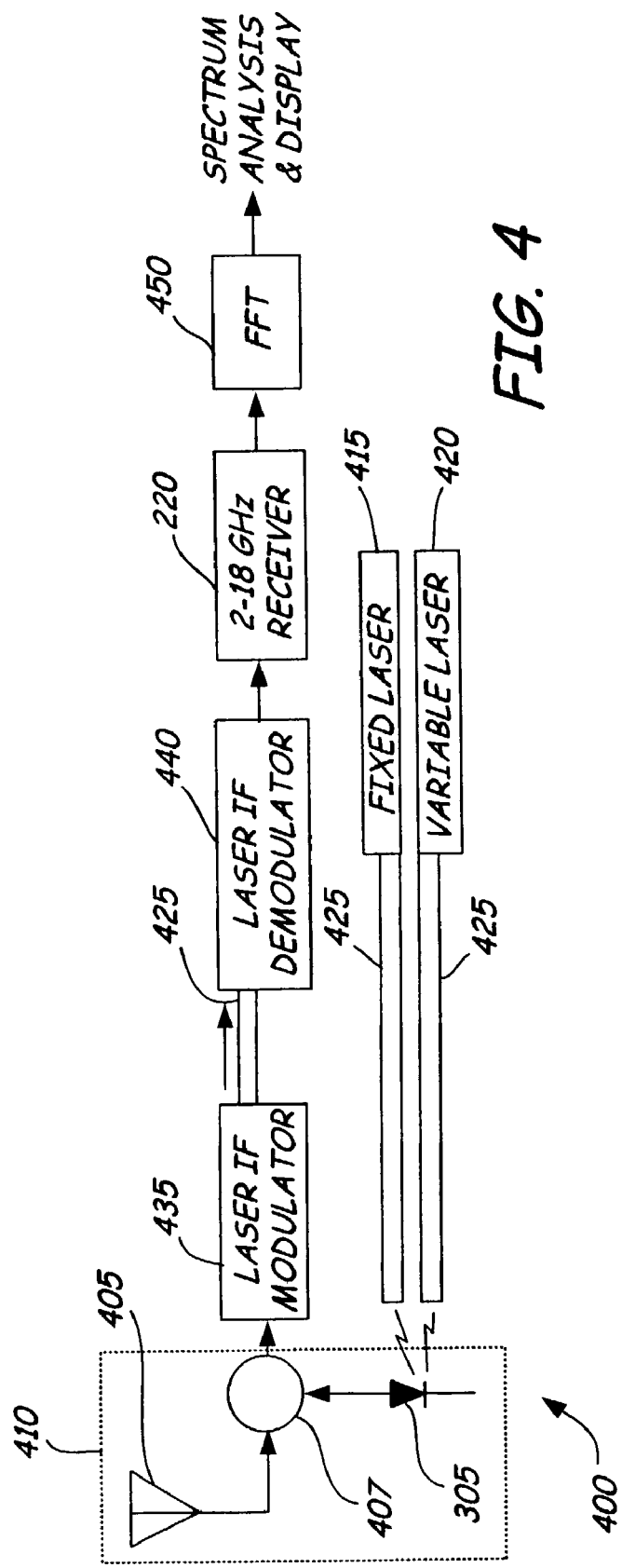
FIG. 4 is a block diagram of a terahertz receiver of the present invention using the photomixer of FIG. 3.

The present invention advances the previous experimental work toward an ultrawideband RF receiver 400 shown in FIG. 4. An integrated circuit 410 includes an antenna 405, the photomixer 305, and an RF mixer 407 to form a block converter. The integrated circuit 410 allows a local oscillator signal generated by the photomixer 305 to be directly coupled to the on-chip Schottky-diode mixer circuit 407. The wideband log spiral antenna 405 covers the 20–120 GHz range and can be expanded to 20–600 GHz. Other types of antennas known in the art may also be used. An IF output from the integrated circuit block converter 410 is applied to the 2–20 GHz receiver 220 for fine resolution tuning and further processing.

The photomixer 305 local oscillator is pumped by a fixed continuous wave (CW) laser 415 with a constant output power and wavelength $\lambda_1$, and a free-running variable laser 420 whose wavelength $\lambda_2$ is tunable. The fixed laser 415 and variable laser 420 illuminate the photomixer through fiber optic cables 425. The tunability of the variable laser 420 may be realized by a number of methods such as varying the laser temperature under electronic control. A search receiver application requires sweeping the laser 420 between its lower and upper temperature (and wavelength) limits, either as a sawtooth or triangular waveform pattern. The instantaneous frequency of the photomixer 305 local oscillator is determined by subtracting the fixed wavelength $\lambda_1$ of the fixed laser 415 from the wavelength $\lambda_2$ of the variable laser 420, $\lambda_2 - \lambda_1$.

The variable laser 420 may be phase-locked to allow precise stable tuning steps. Phase locking will offer digital frequency tuning accuracy and repeatability. Phase locking may be accomplished by any number of known means in the art.

Figure 5:
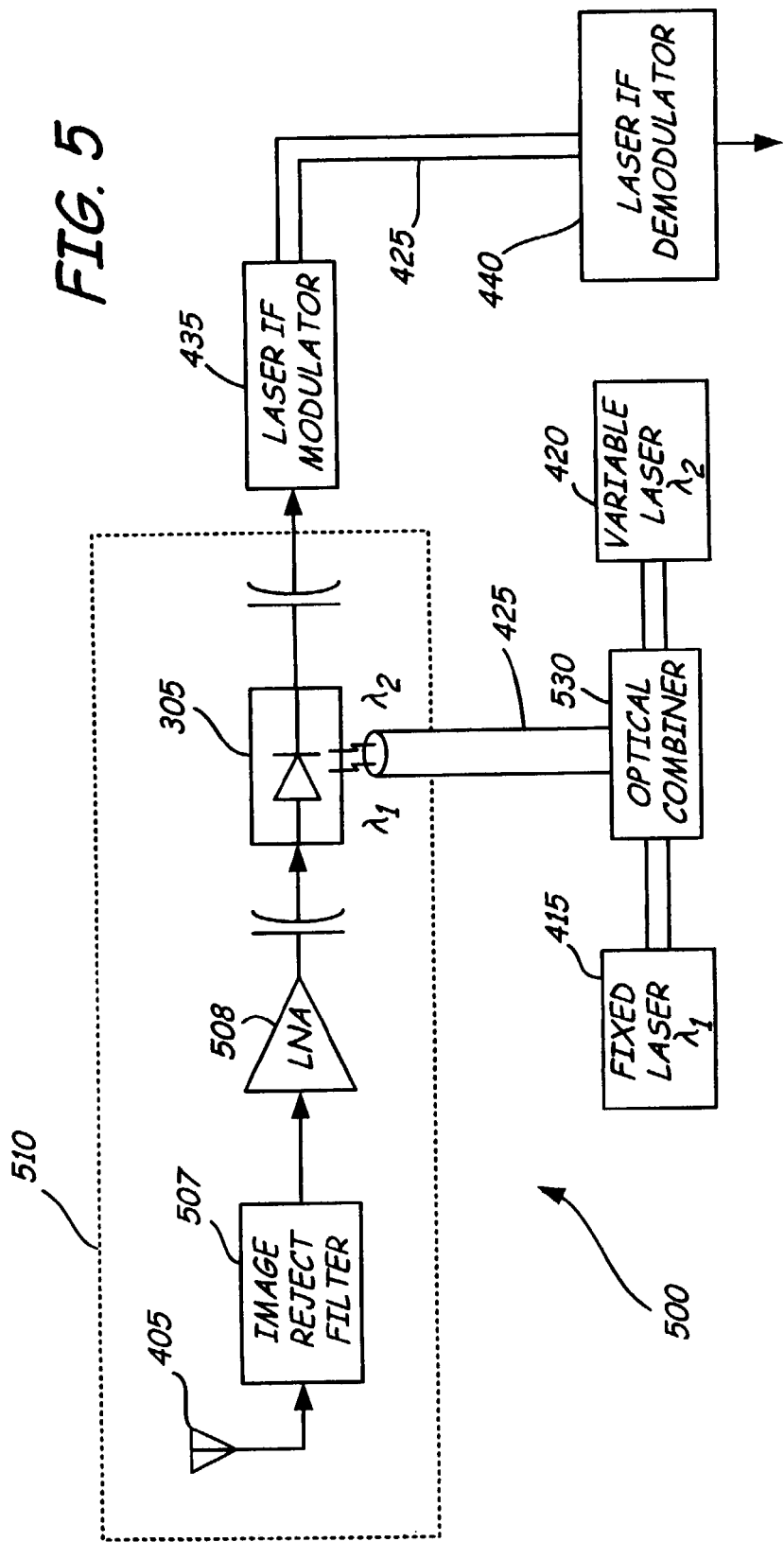
FIG. 5 is a block diagram of another embodiment of a terahertz receiver of the present invention.

Two fiber optic cables 425 are shown in FIG. 4. The two laser outputs may be combined in an optical combiner 530 and a single fiber optical cable 425 may be connected to the combiner output to provide the combined laser beams to the photomixer 305 as shown in FIG. 5.

An analog laser IF modulator 435 may be used to modulate a laser beam and another fiber optic cable 425 to conduct the laser beam to a laser IF demodulator 440 that then demodulates the laser beam and passes it to the tunable IF receiver 220 for further processing. The fiber optic cable 425 connected to the IF modulator 435 may be combined with the single fiber optic cable 425 that provides the combined laser beam to the photomixer 305 using optical methods and devices known in the art. Conventional coaxial cable interconnect means may also be used to conduct the IF signal to the tunable receiver 220. The laser IF modulator 435 and demodulator 440 are known in the art and are commercially available devices.

The system architecture 400 shown in FIG. 4 of the present invention is that of a superheterodyne receiver. A characteristic of this architecture is the lack of image rejection due to the lack of selectivity between the antenna 405 and mixer 407. For the search receiver application a fast Fourier transform 450 eliminates image responses mathematically by performing pattern matching and masking using FFT data processing while continuously scanning a desired band. More specifically, high side and low side scans of a desired center frequency are compared, and redundancies removed by masking a redundant spectral product. Due to the relatively uncrowded nature of the millimeter-wave and terahertz spectrum, this technique will result in very useful performance for a wideband search system.

The search receiver 400 of FIG. 4 may be utilized over a frequency range of typically 20–120 GHz and expanded to higher frequencies by implementation of appropriate semiconductor processes.

The integrated circuit 410 combines the planar antenna 405, RF mixer 407, photomixer 305, and an IF output network (not shown) in a single package. Each of these devices may typically be fabricated from InGaAs lattice-matched to an InP substrate as an example.

It should be noted that the use of lasers to generate the local oscillator signal allows the use of the conventional fiberoptic cables 425 to deliver the pump power to the photomixer 305 from remote tunable and fixed lasers and the IF signal to the tunable receiver 220. This permits the millimeter-wave and terahertz converter 410 to be located hundreds or even thousands of feet of cable run away from a central collection location, thanks to the use of low-loss fiberoptic cable versus traditional cable or waveguide whose loss increases exponentially with frequency for both the local oscillator signals and the IF output. The capability to remotely locate converters is unknown with any current technology at terahertz frequencies.

The present invention results in a novel terahertz-range signal receiver 400 architecture that is capable of fast-tuning and continuous signal coverage from microwave up through the terahertz range. This receiver 400 is well suited to various applications in electronic warfare. The receiver 400 of the present invention is also suitable for applications in test equipment as well as fiberoptic communications networks and wireless communications systems. Yet another application may be a radar receiver with extremely fine resolution.

Another embodiment of a terahertz receiver 500 using the photomixer 305 is shown in FIG. 5. In this embodiment converter 510 comprises the antenna 405, an image reject filter 507 connected to the antenna, a low noise amplifier (LNA) 508, and the photomixer 305. The RF mixer 407 of FIG. 4 is eliminated and mixing of a received RF signal with the local oscillator generated from the difference frequencies of the two laser beams also occurs in the photomixer 305. The image reject filter 507 may be a fixed or tunable filter depending on application requirements. The image reject filter 507 may also be eliminated and images processed by the FFT 450 as in FIG. 4.

In the embodiment shown in FIG. 5, fixed laser 415 at $\lambda_1$ and variable laser 420 at $\lambda_2$ have their outputs combined in an optical combiner 530 and a single fiber optic cable 425 conducts the laser beams to illuminate the photomixer 305. The laser IF modulator 435, IF fiber optic cable 425, and laser IF demodulator 440 may again be used as in FIG. 4 or conventional coaxial cables may be used. Alternately, IF filters and amplifiers (not shown) may be used. Using fiber optic cables 425 again allows remotely locating the converter 510 at great distances from the remainder of the receiver.

Figure 6:
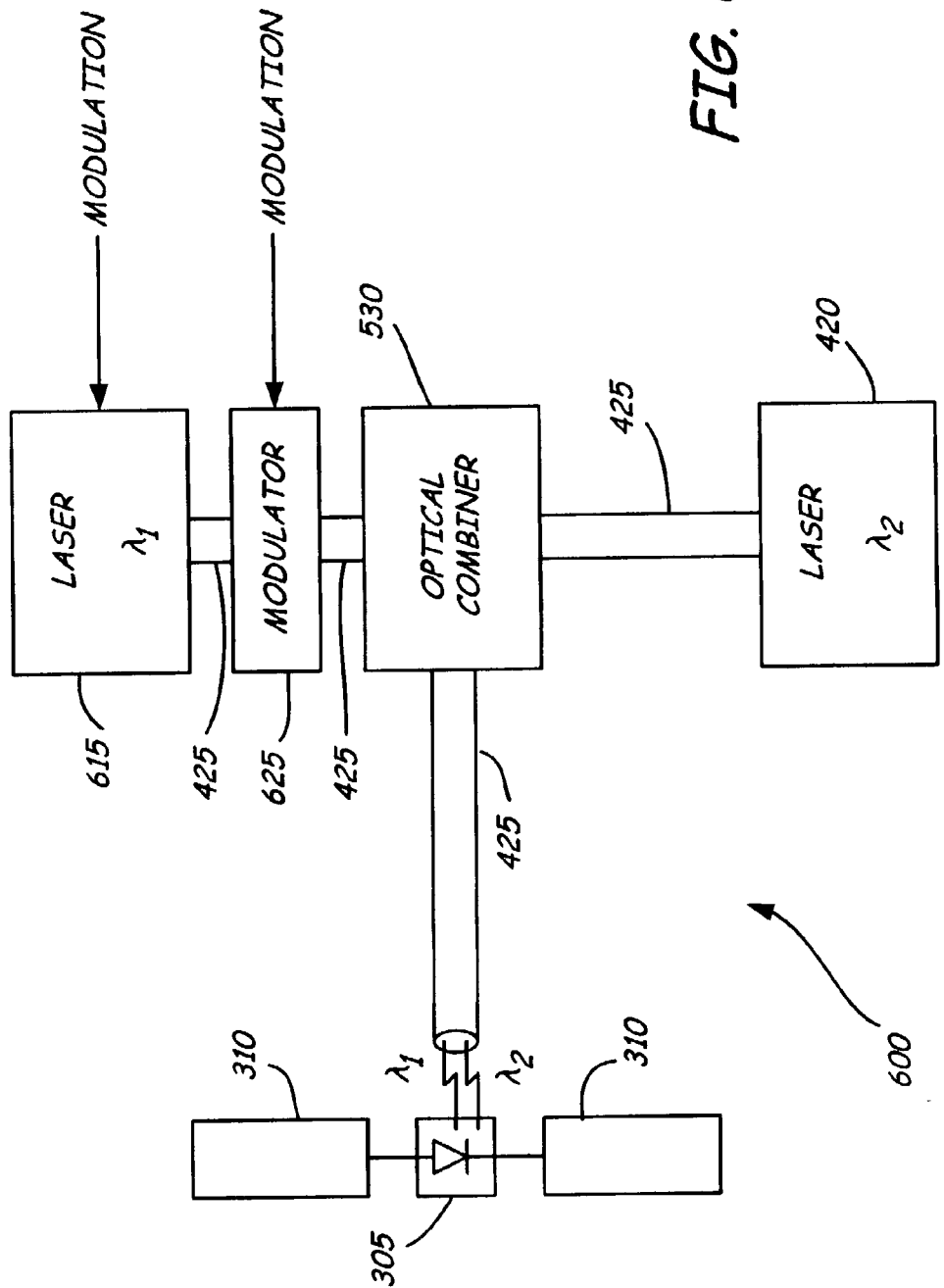
FIG. 6 is a block diagram of a terahertz range transmitter using the photomixer of FIG. 3.

A terahertz-range transmitter 600 using the photomixer 305 is shown in FIG. 6. A laser 615 may be directly modulated by a desired form of modulation, depending on communications system requirements to output a modulated laser signal at a first frequency. The modulation may be amplitude, wavelength (frequency), or phase modulation. Modulation of the laser 615 is accomplished by conventional means. The laser 615 output may be modulated by an optional external modulator 625. The same types of modulation may again be utilized. The laser 615 may be modulated directly and the external modulator 625 may also be used to enable modulating with two modulating signals.

The modulated laser signal is connected with fiber optic cables 425 to the optical combiner or multiplexer 530 as in the receiver 500. Another laser 420 provides a second laser signal over another fiber optic cable 425 to the combiner 530. This second laser 420 may be varied in frequency to tune the transmitter 600 to a desired frequency. The combined laser beams from the fiber optic cable 425 is connected to the photomixer 305 to generate a transmit frequency in the terahertz frequency range where the transmit frequency is the difference between the two laser frequencies $\lambda_2 - \lambda_1$ as in the terahertz receiver 400. The antenna 310 radiates the modulated terahertz transmit signal.

The antenna 310 may be eliminated and the output of the photomixer 305 may be coupled to a power amplifier (not shown) to increase the power level and then radiated by an external antenna (not shown). The antenna 310 may be used to radiate the modulated signal to a spatial power combining power amplifier known in the art to obtain a high-power output signal. A spatial power combiner is an array of unit cells forming a grid. Each cell comprises an input antenna, a monolithic microwave integrated circuit (MMIC) amplifier, and an output antenna.

As with the terahertz receivers 400 and 500, the transmitter 600 may have the photomixer 305, antenna 310, and any associated power amplifiers remotely located from the laser sources 515 and 520. The use of a long fiber optic cable having low losses enables such an installation. Long coaxial cables have prohibitive losses in the terahertz frequency range.

A terahertz transceiver 700 employing the photomixer 305 is shown in FIG. 7. The terahertz transceiver 700 is a homodyne optical full-duplex transceiver. In an RF module 710 receiver portions of the transceiver 700 include the receive antenna 405, optional image reject filter 507, and LNA 508 as in the superheterodyne receiver 500 of FIG. 5. A transmit antenna 705, optional transmit filter 707, and power amplifier 708 form portions of the transmitter. A combiner/splitter 709 or circulator provides the input to the power amplifier 708 from the photomixer 305 and provides the received signals to the photomixer 305 and the rest of the circuitry. A high-pass filter 715 filters the receiver and transmitter signals to and from the photomixer 305. The high-pass filter 715 passes the local oscillator frequency and the received signal while blocking the baseband signal. The fiber optic cable 425 provides the two laser beam inputs to the photomixer 305 from the optical combiner 530 as in FIGS. 5 and 6. Laser 615 providing a laser beam at wavelength $\lambda_1$ is modulated as in FIG. 6. Laser 420 providing a laser beam at wavelength $\lambda_2$ may be tunable to vary the transceiver 700 frequency. The receiver output from the photomixer 305 is passed through a low-pass filter 720 for further baseband processing. The low-pass filter blocks the local oscillator frequency and the received signal but passes the baseband signal.

The photomixer 305 generates the LO (local oscillator) at $\lambda_2 - \lambda_1$ as in the receivers 400 and 500 and transmitter 600. For this example laser 615 is assumed to be frequency modulated thereby varying its wavelength (frequency) as a function of time $\lambda_1(t)$. The transmitted signal then is at $\lambda_2 - \lambda_1(t)$. The receiver portion of transceiver 700 operates as a homodyne or direct conversion receiver. The received signal is mixed with the LO at $\lambda_2 - \lambda_1(t)$ resulting in a receive signal at baseband. The baseband signal contains a frequency modulated component due to being mixed with the LO signal having the transmit frequency modulated component $\lambda_1(t)$. The modulation may be cancelled by applying an out-of-phase modulating signal to the receiver baseband signal.

It is believed that the electro optic microwave communications system of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An electro optic microwave communications system comprising a receiver for receiving a high frequency microwave transmitted signal said receiver comprising:

an antenna to receive the transmitted signal and to provide a received signal;

a photomixer connected to the antenna to provide an injection signal to mix with the received signal to down convert the received signal to an intermediate frequency (IF) signal;

a fixed laser that illuminates the photomixer at a first frequency;

a tunable laser that illuminates the photomixer at a second frequency; and at least one fiberoptic cable that connects the fixed laser and the tunable laser to the photomixer;

wherein said photomixer mixes the fixed laser and the tunable laser to provide the injection signal at frequency equal to the difference of the first frequency and the second frequency.

2. The electro optic microwave communications system receiver of claim 1 further comprising a mixer connected to the antenna and the photomixer to mix the received signal with the injection signal to down convert the received signal to the IF signal.

3. The electro optic microwave communications system receiver of claim 1 wherein the photomixer mixes the injection signal with the received signal to down convert to the IF signal.

4. The electro optic microwave communications system receiver of claim 1 wherein the at least one fiber optic cable comprises:

a first fiberoptic cable that connects the fixed laser to the photomixer; and a second fiberoptic cable that connects the tunable laser to the photomixer.

5. The electro optic microwave communications system receiver of claim 1 further comprising:

an optical combiner connected to the fixed laser and the tunable laser; and the at least one fiber optic cable connected to the optical combiner and the photomixer.

6. The electro optic microwave communications system receiver of claim 2 further comprising:

a laser IF modulator connected to the mixer to modulate a laser beam with the IF signal;

an IF fiberoptic cable connected to the laser IF modulator to transmit the IF modulated laser beam; and a laser IF demodulator connected to the fiberoptic cable to receive and demodulate the IF modulated laser beam.

7. The electro optic microwave communications system receiver of claim 6 further comprising:

an IF receiver tuned to the IF signal to further process the IF signal to a lower IF frequency.

8. The electro optic microwave communications system receiver of claim 6 wherein a length of the at least one fiberoptic cable and the IF fiberoptic cable is sufficient to remotely locate the antenna, photomixer, and laser IF modulator.

9. The electro optic microwave communications system receiver of claim 7 further comprising a fast Fourier transform (FFT) connected to the IF receiver to eliminate image responses and provide an output.

10. The electro optic microwave communications system receiver of claim 3 further comprising:

an image reject filter connected to the antenna to reject receiver image response signals; and a low noise amplifier connected to the image reject filter and the photomixer to amplify the received signals.

11. An electro optic microwave communications system receiver for receiving a high frequency microwave transmitted signal said receiver comprising:

an antenna to receive the transmitted signal and to provide a received signal;

a mixer connected to the antenna to mix the received signal with an injection signal to down convert the received signal to an intermediate frequency (IF) signal;

a photomixer connected to the mixer to provide the injection signal to mix with the received signal to down convert the received signal to the IF signal;

a fixed laser that provides a fixed laser beam at a first frequency;

a tunable laser that provides a tunable laser beam at a second frequency;

an optical combiner connected to the fixed laser and the tunable laser to combine the fixed laser beam and the tunable laser beam; and a fiberoptic cable connected to the optical combiner to connect the fixed laser beam and the tunable laser beam to the photomixer;

wherein said photomixer mixes the fixed laser beam and the tunable laser beam to provide the injection signal at frequency equal to the difference of the first frequency and the second frequency.

12. The electro optic microwave communications system receiver of claim 11 further comprising:

a laser IF modulator connected to the mixer to modulate a laser beam with the IF signal;

an IF fiberoptic cable connected to the laser IF modulator to transmit the IF modulated laser beam; and a laser IF demodulator connected to the fiberoptic cable to receive and demodulate the IF modulated laser beam.

13. The electro optic microwave communications system receiver of claim 12 further comprising:

an IF receiver tuned connected to the laser IF demodulator to further process the IF signal to a lower IF frequency; and a fast Fourier transform (FFT) connected to the IF receiver to eliminate image responses and provide an output.

14. The electro optic microwave communications system receiver of claim 12 wherein the length of the fiberoptic cable and the IF fiberoptic cable is sufficient to remotely locate the antenna, photomixer, and laser IF modulator.

15. An electro optic microwave communications receiver for receiving a high frequency microwave transmitted signal said receiver comprising:

an antenna to receive the transmitted signal and to provide a received signal;

a photomixer connected to the antenna to provide an injection signal to mix with the received signal to down convert the received signal to an intermediate frequency (IF) signal;

a fixed laser that illuminates the photomixer at a first frequency;

a tunable laser that illuminates the photomixer at a second frequency;

an optical combiner connected to the fixed laser and the tunable laser to combine the fixed laser beam and the tunable laser beam; and a fiberoptic cable connected to the optical combiner to connect the fixed laser beam and the tunable laser beam to the photomixer;

wherein said photomixer mixes the fixed laser beam and the tunable laser beam to provide the injection signal at a frequency equal to the difference of the first frequency and the second frequency and mixes the injection signal with the received signal to down convert to the IF signal.

16. The electro optic microwave communications system receiver of claim 15 further comprising:
   an image reject filter connected to the antenna to reject receiver image response signals; and
   a low noise amplifier connected to the image reject filter and the photomixer to amplify the received signals.

17. The electro optic microwave communications system receiver of claim 15 further comprising:
   a laser IF modulator connected to the photomixer to modulate a laser beam with the IF signal;
   an IF fiberoptic cable connected to the laser IF modulator to transmit the IF modulated laser beam; and
   a laser IF demodulator connected to the fiberoptic cable to receive and demodulate the IF modulated laser beam.

18. The electro optic microwave communications system receiver of claim 17 further comprising an IF receiver connected to the laser IF demodulator to further process the IF signal to a lower IF frequency.

19. The electro optic microwave communications system receiver of claim 17 wherein the length of the fiberoptic cable and the IF fiberoptic cable is sufficient to remotely locate the antenna, photomixer, and laser IF modulator.

* * * * *